United States Patent [19]

Horikawa

[11] Patent Number: 5,331,456
[45] Date of Patent: Jul. 19, 1994

[54] RADIATION MICROSCOPE

[75] Inventor: Yoshiaki Horikawa, Hachiouji, Japan

[73] Assignee: Olympus Optical Co., Ltd., Tokyo, Japan

[21] Appl. No.: 986,763

[22] Filed: Dec. 8, 1992

[30] Foreign Application Priority Data

Dec. 9, 1991 [JP] Japan .................................. 3-324589

[51] Int. Cl.⁵ .............................................. H01J 3/14
[52] U.S. Cl. ...................................... 359/350; 359/352; 250/372
[58] Field of Search ................... 378/84, 73, 70, 43, 378/71, 87, 34, 35, 62; 359/350, 352, 355, 361, 368, 382; 250/372

[56] References Cited

U.S. PATENT DOCUMENTS 5,225,671 7/1993 Fukuyama .......................... 359/368

OTHER PUBLICATIONS

Radioshack, "Dictionary of Electronics", 1978-1979, p. 784.

*Primary Examiner*—David P. Porta
*Assistant Examiner*—Don Wong
*Attorney, Agent, or Firm*—Cushman, Darby & Cushman

[57] ABSTRACT

An X-ray microscope is equipped with an X-ray source generating radiation including X rays ranging in wavelength from 400 to 600 Å, a beam splitter composed of a thin film which reflects a part of the X rays from the X-ray source and transmits the remainder, an objective, and an X-ray detector. Thus, the X-ray microscope allows the reflected radiation from an sample to be observed in a soft X-ray region, and enables high resolution microscopy even in a thick sample.

3 Claims, 2 Drawing Sheets

RADIATION MICROSCOPE

BACKGROUND OF THE INVENTION a) Field of the Invention

This invention relates to a microscope and, more particularly, to a microscope in which high resolution microscopy of a sample is made by using radiation ranging from extreme vacuum ultraviolet light to soft X rays.

b) Description of the Prior Art

In general, a resolving power $\delta$ of the imaging optical system of a microscope is given by $$\delta = 0.61 \lambda / NA \qquad (1)$$

where $\lambda$ is the wavelength and NA is the numerical aperture.

In ordinary optical microscopes, when an oil-immersion objective lens of the largest numerical aperture of nearly 1.4 is used with visible light of a wavelength $\lambda$ of 5500 Å, the resolving power $\delta$, from Eq. (1), becomes 2400 Å (0.24 μm). Shortening of the wavelength $\lambda$ to be used is considered as a provision for improving the resolution in terms of Eq. (1). This brings about the development of ultraviolet microscopes using light in the ultraviolet region and X-ray microscopes using radiation in the soft X-ray region.

For the X-ray microscope, when the soft X rays having a wavelength of 40 Å is applied, the resolving power $\delta$ amounts to 100 Å (0.01 μm) even with the use of an objective lens with a numerical aperture NA of 0.25. This is suitable for high resolution microscopy. In the soft X-ray region, however, the refractive index of any substance is nearly 1 and little reflection occurs, so that it is difficult to observe the reflected radiation from a sample. Thus, a transmission type microscope optical system had to be employed.

Referring now to FIG. 1, a description is given of such a conventional transmission type radiation microscope. In this microscope, a total reflection type mirror optical system utilizing a total reflection phenomenon is applied to the objective optical system. In the figure, reference numeral 1 denotes a laser plasma radiation source or a synchrotron radiation source; 2 a condenser composed of a grazing incidence type total reflection mirror, for focusing radiation rays emitted from the source 1 to irradiate a sample 3; 4 an objective composed of a grazing incidence type total reflection mirror, for imaging the X rays transmitted through the sample 3 on an image detector 5; and 6 a filter for blocking unwanted radiation. The image detector 5 employs an MCP (microchannel plate) or a solid-state image sensor, such as a CCD, CMD, AMI, etc., and an image detected by the detector 5 is displayed on a CRT not shown.

In the foregoing microscope, the grazing incidence type total reflection mirrors 2 and 4 can be substituted by zone plate optical systems using diffraction as well as normal incidence optical systems using multilayer film reflection mirrors. For the total reflection type mirror optical system or the normal incidence optical system, however, when a white radiation source, such as the synchrotron radiation source or the laser plasma radiation source, namely, a radiation source emitting not only X rays but also visible light and ultraviolet light is used, radiation excluding soft X rays used for observation will also reach the detector 5. This is because radiation of more than 500 Å in wavelength length is transmitted through the optical system due to a metal reflection. Such unwanted radiation overlaps with the sensitivity region of the MCP or the CCD and causes deterioration of the detection accuracy and resolution of the image for observation in the detector 5. In order to remove the unwanted radiation, the filter 6 is used, made of beryllium or carbon constituting a thin film of 1000 to several thousand angstroms in thickness. Since soft X rays are absorbed into air, the microscope optical system shown in FIG. 1 is disposed in a vacuum.

As in the prior art mentioned above, it is difficult to observe the reflected radiation from the sample in the soft X-ray region, or to fabricate a beam splitter having good performance because of considerable absorption of soft X rays by material. The X-ray microscope thus has had to rely on a transmission type arrangement. Consequently, it has been impossible to observe a sample of large thickness.

SUMMARY OF THE INVENTION

It is, therefore, an object of the present invention to provide a microscope in which, in view of the wavelength for observation, a sample is observed through vertical illumination and thereby high resolution microscopy becomes possible even in the case of the sample of large thickness.

To achieve this object, the microscope according to the present invention is equipped with a radiation source generating radiation including wavelengths from 400 to 600 Å, a beam splitter, an objective, and a radiation detector, the beam splitter being composed of a thin film which reflects a part of the radiation generated from the radiation source and transmits the remainder.

According to the present invention, the microscope comprises a radiation source generating radiation including wavelengths of 400 to 600 Å in wavelength, a beam splitter composed of a thin film which reflects a part of the radiation from the radiation source, an objective focusing the reflected radiation on an object and converging the radiation reflected from the object through the beam splitter at a predetermined position, and a radiation detector receiving the radiation converged by the objective.

This and other objects as well as the features and advantages of the present invention will become apparent from the following detailed description of the preferred embodiment when taken in conjunction with the accompanying drawings.

DETAILED DESCRIPTION OF THE PREFERRED EMBODIMENT

Prior to describing the embodiment of the present invention, reference is made to the function of a thin film of the beam splitter used therein.

In the soft X-ray region, there is little caused reflection of radiation, but with wavelengths of more than 400 Å, the reflection begins to take place and at the same time, the absorption of soft X rays by materials increases. Hence, it is necessary to properly choose a material composed of a thin film of an actually fabricable thickness of 1000 Å (0.1 μm), having transmittance which enables the transmission of radiation from the soft X-ray region up to nearly 600 Å.

Table 1 shows, for several materials usable as thin films, their optical constants and the transmittances and reflectances where the radiation of the soft X-ray region is incident on the corresponding materials. In view of the fact that the beam splitter is fabricated with the thin film, the angle of incidence of the soft X rays is set at 45°. In Table 1, n is the real part of the complex refractive index, k the imaginary part of the complex refractive index, T the transmittance of a film 1000 Å (0.1 μm) thick, R the reflectance of a film 1000 Å (0.1 μm) thick, T' the transmittance of a film 10 μm thick, and R' the reflectance of a film 10 μm thick. The optical constants are cited from "Handbook of Optical Constants of Solids" (ACADEMIC PRESS, INC. ).

reflectance of 10% with respect to the radiation of 516.6 Å in wavelength, can be used as the beam splitter.

Figure 2:
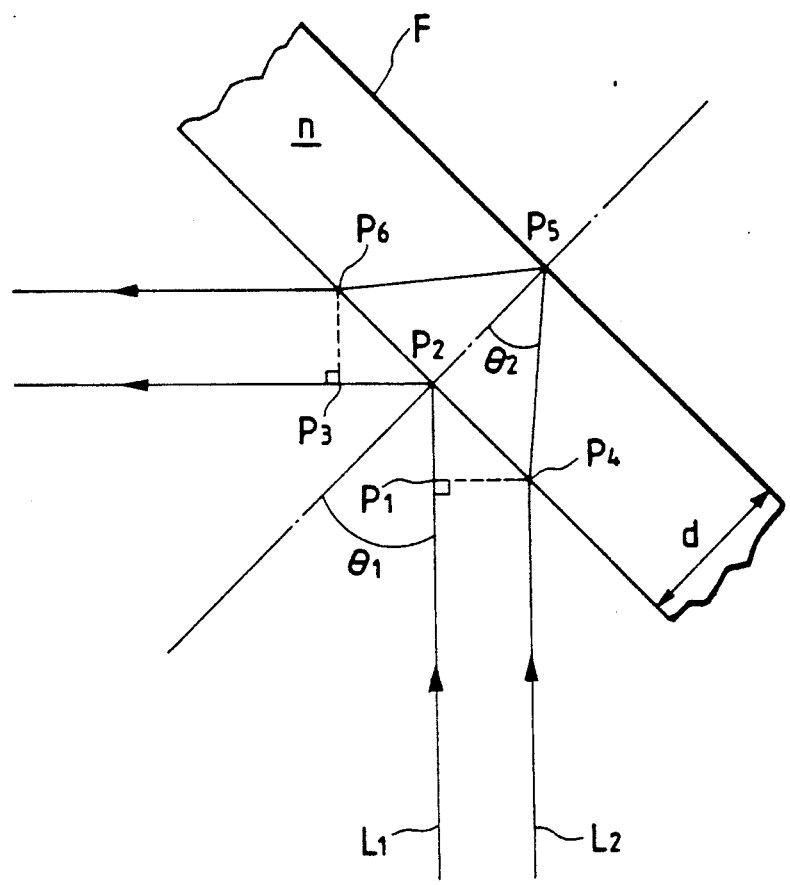
FIG. 2 is a conceptional view showing the action of reflection when radiation is incident on a thin film.

Next, a description is given of the conditions where the thin film is formed as the beam splitter. FIG. 2 is a conceptional view showing the action of reflection of radiation when radiation of a wavelength λ are incident on a thin film F which comprises a material having a refractive index n configured into a thickness d. In this figure, reference symbol $L_1$ represents the optical path of radiation reflected at the front surface of the thin film, $L_2$ the optical path of radiation reflected at the back surface of the thin film, $\theta_1$ the angle of incidence at the front surface of the thin film, and $\theta_2$ the angle of incidence at the back surface of the thin film. A path difference ΔL between the path length ($P_1$-$P_2$-$P_3$) of the optical path $L_1$ and the path length ($P_4$-$P_5$-$P_6$) of the optical path $L_2$, where the radiation incident on the optical system shown does not approximately undergo absorption, can be expressed by $$\Delta L = n \frac{2d}{\cos\theta_2} - 2d \tan\theta_2 \sin\theta_1 \qquad (2)$$

TABLE 1

| Material | Wavelength Å | Optical constant | | | | T' | R' |
|---|---|---|---|---|---|---|---|
| | | n | k | T | R | | |
| Al | 39.8 | 0.995 | 0.00197 | 0.413 | $1.18 \times 10^{-5}$ | 0.0 | $1.47 \times 10^{-5}$ |
| | 206.6 | 0.987 | 0.00441 | 0.68 | $2.1 \times 10^{-4}$ | 0.0 | $9.8 \times 10^{-5}$ |
| | 310 | 0.940 | 0.00816 | 0.604 | $3.5 \times 10^{-4}$ | 0.0 | $2.23 \times 10^{-3}$ |
| | 516.6 | 0.789 | 0.019 | 0.31 | 0.098 | 0.0 | 0.06 |
| | 1000 | 0.0328 | 0.791 | 0.0 | 0.938 | 0.0 | 0.938 |
| Au | 39.8 | 0.991 | 0.00895 | $8.55 \times 10^{-5}$ | 0.02 | 0.0 | $8.28 \times 10^{-5}$ |
| | 206.6 | 0.863 | 0.162 | 0.0 | 0.032 | 0.0 | 0.0 |
| | 310 | 0.795 | 0.334 | 0.0 | 0.09 | 0.0 | 0.0 |
| | 516.6 | 0.872 | 0.740 | 0.0 | 0.098 | 0.0 | 0.0 |
| | 1000 | 1.2 | 0.836 | 0.0 | 0.158 | 0.0 | 0.158 |
| a-Si | 39.8 | 0.996 | 0.00209 | 0.39 | $1.2 \times 10^{-5}$ | 0.0 | $1.0 \times 10^{-5}$ |
| | 206.6 | 0.995 | 0.0235 | 0.184 | $3.7 \times 10^{-4}$ | 0.0 | $2.9 \times 10^{-4}$ |
| | 310 | 0.970 | 0.0326 | 0.146 | $1.2 \times 10^{-3}$ | 0.0 | $1.1 \times 10^{-4}$ |
| | 516.6 | 0.846 | 0.0812 | 0.03 | 0.026 | 0.0 | 0.027 |
| | 1000 | 0.0327 | 0.726 | 0.0 | 0.522 | 0.0 | 0.522 |
| Si$_3$N$_4$ | 39.8 | 0.994 | 0.001989 | 0.41 | $1.1 \times 10^{-5}$ | 0.0 | $2.0 \times 10^{-5}$ |
| | 206.6 | — | — | — | — | — | — |
| | 310 | — | — | — | — | — | — |
| | 516.6 | 0.655 | 0.420 | 0.0 | 0.193 | — | — |
| | 1000 | 1.417 | 1.43 | 0.0 | 0.296 | — | — | a-Si: Amorphous silicone

Figure 1:
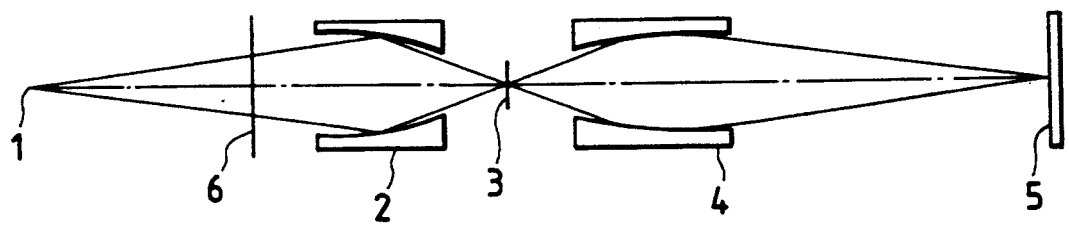
FIG. 1 is a view showing the optical system of a conventional transmission type microscope.

From FIG. 1, it will be seen that when the thin film is 10 μm in thickness, the transmittance becomes 0% at any wavelength of incident radiation and it cannot be used as the beam splitter. Further, for a thin film 1000 Å thick, the transmittance decreases with increasing wavelength of the incident radiation, except for Al (aluminum), while the reflectance increases with increasing wavelength of the incident radiation, irrespective of the thickness of the thin film. When the thin film is utilized for the beam splitter, it is required that both the transmittance and the reflectance have the values of some extent. Hence, these values having the properties contrary to each other in respect of the wavelengths of the incident radiation should be compared and considered, along with the conditions of the formation of the thin film, the wavelengths of radiation used, and the entire optical system. Thus, it is only necessary to choose and determine the optimum material of the thin film such that the performance of the beam splitter can be secured. Table 1 shows that the Al thin film of 1000 Å in thickness, having a transmittance of 30% and a From Eq. (2), the interference condition of this optical system is given as $$2d \left( \frac{n}{\cos\theta_2} - \tan\theta_2 \sin\theta_1 \right) = \left( \frac{1}{2} + m \right)\lambda \qquad (3)$$

where $\sin\theta_1/\sin\theta_2 = n$, and m is the integer.

Further, Eq. (3) is rewritten, as the condition of the thickness d of the thin film F, by $$d = \frac{\sqrt{1 - \left(\frac{\sin\theta}{n}\right)^2}}{2\left(n - \frac{\sin^2\theta}{n}\right)} \left( \frac{1}{2} + m \right)\lambda \qquad (4)$$

Based on Eq. (4), the thin film is formed or the optical system is set, thereby increasing the reflection efficiency of the beam splitter composed of the thin film.

For the resolving power δ in the present invention, where the radiation of 500 Å are used for instance, the largest possible numerical aperture in this wavelength region is NA=about 0.25, so that from Eq. (1), δ=1200 Å (0.12 μm). This enables the high resolution microscopy of the sample according to the present invention.

Figure 3:
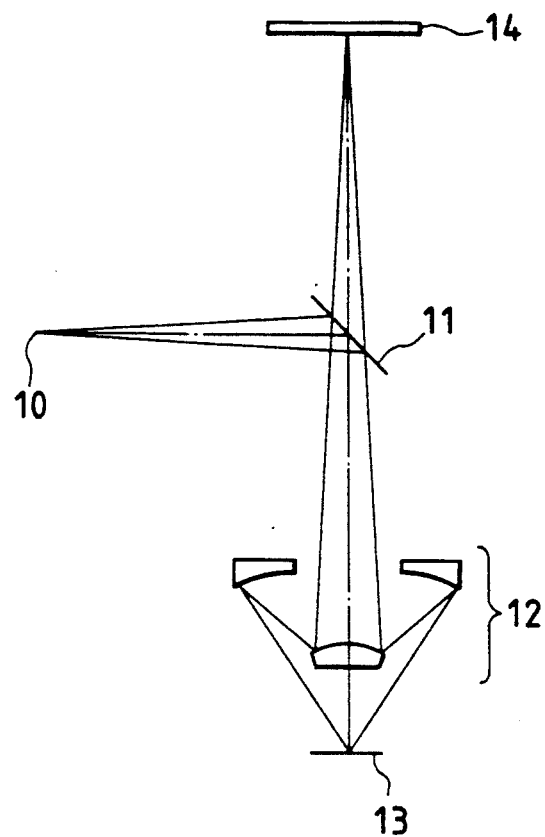
FIG. 3 is a view showing the optical system of an embodiment of the microscope according to the present invention.

Referring to the drawings, the embodiment of the present invention will be explained below. FIG. 3 shows the arrangement of a preferred embodiment of the microscope according to the present invention. In this figure, reference numeral 10 designates a radiation source such as a laser plasma radiation source or a synchrotron radiation source, 11 a beam splitter composed of an Al thin film, 12 a Schwarzschild objective using multilayer film reflecting mirrors, also used as a condenser, 13 a sample, and 14 an image detector for detecting the radiation, such as an MCP or a CCD. Radiation emitted from the radiation source 10 are reflected from the beam splitter 11 to change their directions and after incidence on the objective 12, brought to a focus on the sample 13. The radiation reflected back from the sample 13 pass through the objective 12, are transmitted through the beam splitter 11, and come to a focus on the image detector 14. Thus, the detected image is displayed on the CRT, not shown, through the detector 14, and the sample is observed.

Next, reference is made to the beam splitter 11 composed of the Al thin film used in the present invention. Table 2 shows the values of the thicknesses, reflectances, and transmittances of the thin films formed of Al as a material, in regard to incident radiation having a wavelength of 516.6 Å. Here, the angle of incidence on the thin film is 45°.

TABLE 2

| Thickness Å | Reflectance % | Transmittance % | Thickness Å | Reflectance % | Transmittance % |
|---|---|---|---|---|---|
| 200 | 12 | 73 | 1050 | 10.4 | 29 |
| 250 | 15 | 67 | 1100 | 10.4 | 27 |
| 300 | 16 | 62 | 1200 | 8.8 | 25 |
| 350 | 16 | 58 | 1300 | 6.2 | 22 |
| 400 | 15 | 55 | 1600 | 5.7 | 17 |
| 450 | 13 | 52 | 1650 | 6.0 | 16 |
| 500 | 11 | 50 | 1700 | 7.4 | 15 |
| 550 | 8 | 49 | 1750 | 7.9 | 14 |
| 800 | 3.2 | 41 | 1800 | 8.2 | 14 |
| 900 | 6.8 | 36 | 1850 | 8.0 | 13 |
| 1000 | 9.8 | 31 | 1900 | 7.7 | 12 |

From Table 2, it will be seen that when the thin films are formed with the thicknesses of nearly 300, 1100, and 1800 Å, their transmittances and reflectances both have large values. Further, it can be understood that the transmittance decreases with increasing thickness, and the reflectance gradually decreases as a whole while repeating its increase and decrease at a constant period with increasing thickness. This fact is attributable to the interference of radiation reflected from both surfaces of the thin film due to its small thickness. Specifically, substitution of the requirements of the embodiment using the Al thin film, namely, an incident angle of 45° and a refractive index of 0.789, in Eq. (3) for the interference condition to find the film thickness d most suitable for the embodiment, gives $$d = 737(m + \tfrac{1}{2})$$

The values calculated by substituting m=0, 1, 2, ... in order in this equation coincide practically with those of the film thicknesses corresponding to the reflectances having the constant period shown in Table 2.

When the film thickness becomes large, the absorption of radiation increases and consequently, the transmittance reduces. From the results shown in Table 2, it is naturally expected that when the film is formed with a thickness of 2000 Å or more, the transmittance becomes 10% or less. In this case, the film cannot be utilized as the beam splitter. Hence, in the embodiment using the Al thin film, the thin film, which is formed with a thickness of less than 2000 Å, will have the transmittance required to secure performance for the beam splitter.

Figure 4:
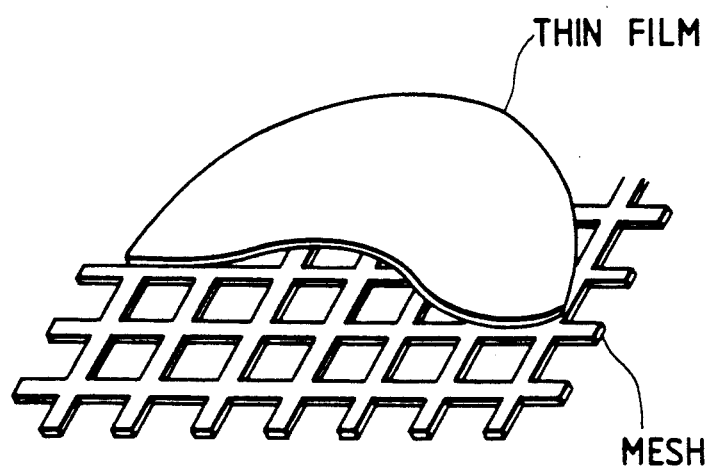
FIG. 4 is a view for explaining a state where the thin film is formed on a mesh.

As mentioned above, the thickness of the thin film utilized as the beam splitter is very small, so that it is difficult, due to its restricted strength, that the formed thin film is solely disposed in the optical system. Thus, as shown in FIG. 4, the thin film may be formed on a mesh composed of a proper material, such as a metal, to raise the strength. In such an instance, however, since the thin film suffers considerable deterioration in flatness, the placement of the beam splitter such that the imaging optical path is reflected by the thin film brings about the reduction of imaging performance. This is unfavorable. Consequently, as shown in FIG. 3, it is desirable to construct the optical system such that the radiation emitted from the radiation source 10 are reflected by the beam splitter 11 to change their directions, and the reflected radiation from the sample 13 is transmitted through the beam splitter 11.

Table 3 shows wavelength dependence of the beam splitter composed of the Al thin film having a thickness of 1000 Å which is used in the embodiment.

TABLE 3

| Wavelength Å | n | k | Reflectance % | Transmittance % |
|---|---|---|---|---|
| 413.3 | 0.876 | $1.25 \times 10^{-2}$ | 2.8 | 51 |
| 442.8 | 0.854 | $1.45 \times 10^{-2}$ | 1.5 | 47 |
| 476.9 | 0.826 | $1.65 \times 10^{-2}$ | 3.1 | 41 |
| 516.6 | 0.789 | $1.90 \times 10^{-2}$ | 9.8 | 31 |
| 563.6 | 0.740 | $2.22 \times 10^{-2}$ | 14.8 | 15 |
| 619.9 | 0.668 | $2.68 \times 10^{-2}$ | 59 | 1 |

From Table 3, it will be seen that the microscope of the present invention uses radiation ranging in wavelength from 400 to 600 Å as the radiation source 10, thereby allowing the microscopy of the sample in this region.

In the embodiment, a Schwarzschild multilayer film reflecting mirror is used as the objective 12. Alternatively, a zone plate utilizing diffraction as well as a grazing incidence mirror utilizing total reflection can also be applied. Even in the case where a white light source is used for the radiation source, unnecessary radiation is blocked by the beam splitter composed of the thin film, and detection accuracy can be increased by further disposing a proper filter in the optical path. Also, the beam splitter can, of course, be constructed of a multilayer film.

What is claimed is:
1. A microscope comprising:
   a radiation source for emitting radiation ranging in wavelength at least from 400 to 600 Å;
   a beam splitter;
   an objective; and
   a detector for detecting said radiation;
   wherein said beam splitter is composed of a film which reflects a part of said radiation emitted from said radiation source and transmits a remaining part of said radiation.

2. A microscope according to claim 1, wherein said film is formed to substantially satisfy a condition, in terms of thickness, given by $$d = \frac{\sqrt{1 - \left(\frac{\sin\theta}{n}\right)^2}}{2\left(n - \frac{\sin^2\theta}{n}\right)} \left(\frac{1}{2} + m\right)\lambda$$

where d is a thickness of said film, Θ is an angle of incidence of said radiation on said film, n is a refractive index of a material composing said film, λ is a wavelength of said radiation, and m is an integer.

3. A microscope of reflection type, comprising:
a radiation source for emitting radiation ranging in wavelength at least from 400 to 600 Å;
a beam splitter composed of a film reflecting a part of radiation emitted from said radiation source;
an objective for converging said radiation reflected from said beam splitter on an object and focusing said radiation reflected from said object through said beam splitter at a predetermined position; and
a detector for receiving said radiation focused by said objective.

* * * * *